Sept. 19, 1950  D. BLITZ  2,522,563
STANDING WAVE DETECTOR
Filed Jan. 16, 1946
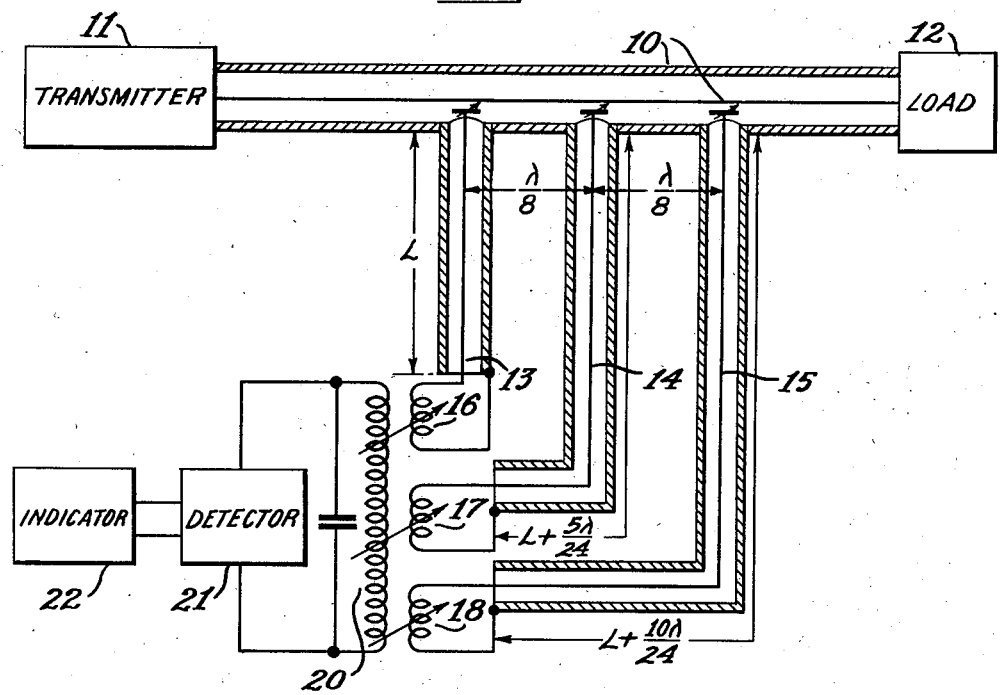
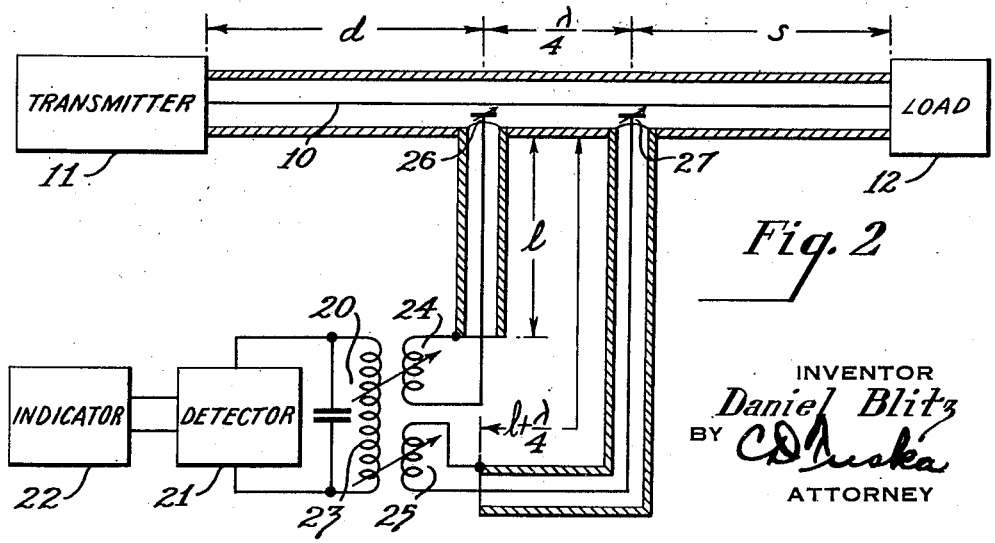
INVENTOR
*Daniel Blitz*
BY
ATTORNEY Patented Sept. 19, 1950

2,522,563

UNITED STATES PATENT OFFICE 2,522,563

STANDING WAVE DETECTOR

Daniel Blitz, Princeton, N. J., assignor to Radio Corporation of America, a corporation of Delaware Application January 16, 1946, Serial No. 641,596

5 Claims. (Cl. 178—44)

The present invention relates to the transmission of electric energy along a transmission line and more particularly to the detection of any standing waves on that line.

In the transmission of signals over a transmission line terminating in a load, the development of reflected waves due to load variations results in the production of standing waves which interfere with the incident waves to impair the reception of the transmitted signal.

It is an object of the present invention to detect the development of any standing wave in a line which is initially matched as to the resistive load and the line impedance and therefore normally free of reflections and standing waves.

A further object is to provide a system wherein any developed standing wave in a transmission line is automatically detected and indicated or caused to actuate a control device.

Other objects will appear hereinafter.

In the accompanying drawing, Fig. 1 represents a circuit embodying one form of the present invention; and Fig. 2 represents a circuit embodying a modified form of the invention.

Referring to the drawings, a transmission line 10 of any conventional character, either in the form of parallel wires or coaxial lines is shown and arranged to receive signals from a transmitter 11 and transmit the same to a suitable receiver 12. In this instance, the receiver 12 is a resistive load arrangement to match the line impedance so that under normal operating conditions the outgoing signal is completely absorbed by the load and there are no reflections and no standing waves.

In order to detect standing waves which are caused to develop by variations of load from the normal matched condition, the line 10 is tapped, in this instance, at three pick-up points respectively by coupling lines 13, 14 and 15, terminating respectively in three coils 16, 17 and 18, which are inductively coupled to a resonant circuit 20. As shown, the three pick-up points are located where it is desired to determine the presence of a standing wave and in the preferred arrangement are one-eighth of a wave length apart. The length of the coupling lines is such that the signals coupled to the resonant circuit 20 will be separated by 120° in phase and if the three sampled signals are of the same amplitude, the net signal impressed will be zero and there will be no output from the detector 21, which is included in the resonant circuit. Where the coupling or pick-up lines are spaced by one-eighth of a wave length, it has been found that the respective lengths, considered from the shortest to the longest can be determined respectively by $$l, l+\frac{5\lambda}{24}$$

and $$l+\frac{10\lambda}{24}$$

thereby producing the desired phase difference. The coupling between transmission line 10 and lines 13, 14 and 15, or at points 16, 17 and 18 should be such as to make the three signals of equal amplitude, and should be sufficiently small that there is a minimum of reaction back on line 10. If the load changes so it no longer matches the line impedance, a standing wave develops along the transmission line 10, so that the three sample signals will be of different amplitudes and therefore will no longer cancel out in the resonant circuit and the detector will have a resultant output which can then be used to operate some well known form of warning device 22, such as an indicator, relay, circuit breaker or other responsive means as a notification of the existence of a standing wave.

In the form of the invention shown in Fig. 2 the resonant circuit 20, the detector 21, and the warning device 22 are employed as in the showing of Fig. 1, but, in this instance, the coil 23 of the resonant circuit is arranged in coupled relation to two coils 24 and 25, the former of which is responsive to a wave pick-up point 26 on the transmission line at $d$ distance from the transmitter 11, and forms a coupling line of the coil 24 of length $l$. The latter coil 25 is responsive to a wave pick-up point 27 on the transmission line located one quarter of a wave length on one side from the pick-up point 26, and on the other side at a distance $s$ from the load. With this construction, a signal going from the transmitter 11 to the load 12 reaches the circuit of the detector 21 through two paths, the first of which has a delay distance $d+l$, and the second a distance $$d+l+\frac{\lambda}{2}$$

The two signals reaching the detector are 180° out of phase, and if the coupling is adjusted so that the signals are of equal strength, they will balance each other out and the detector voltage output will be zero. If there is a mismatch at the load, there will be a signal on the line travelling from the load back to the transmitter, and the two paths to the detector from the load are both equal to $$s+l+\frac{\lambda}{4}$$

and hence are in phase at the detector and produce a signal which can operate the indicator or warning device. The coupling is so arranged that there is minimum reaction back on the transmission line by the network, consistent with the minimum amount of signal required to operate the detector.

It will now be apparent that a novel system for detecting standing waves on a transmission line, either of parallel wires or coaxial wires, has been devised and which functions automatically in response to a standing wave occurring in a line normally free of such waves. Any such wave detected is utilized by the present system to indicate its presence either visually, audibly or by a control functioning to stop the signal transmitting means.

Having thus described my invention, I claim:

1. In an electric energy transmitting system, the combination of a transmission line, a transmitter, a resistive load as a terminus of said line, said load being matched with the impedance of said line and subject to change, a resonant circuit, a plurality of conducting lines connected to said transmission line and all coupled to said resonant circuit, and means maintaining the energy on said lines of equal amplitude during said matched condition but functioning under a change of said matched condition to produce relatively different energy amplitudes whereby said resonant circuit indicates the presence of a standing wave.

2. In an electric energy transmitting system, the combination of a transmission line, a transmitter, a resistive load as a terminus of said line, said load being matched with the impedance of said line, a resonant circuit, three conducting lines connecting to said transmission line at predetermined spaced points and all coupled in predetermined phase relation to said circuit so that the signals are one hundred and twenty degrees out of phase with each other, whereby under said matched condition the net signal impressed upon said circuit is zero but under unmatched condition said circuit is energized as a function of a standing wave.

3. In an electric energy transmitting system, the combination of a transmission line, a transmitter, a resistive load as a terminus of said line, said load being matched with the impedance of said line, a resonant circuit, three conducting lines connected to said transmission lines one-eighth of a wave length apart and all inductively coupled in predetermined phase relation to said resonant circuit one hundred and twenty degrees out of phase with each other, whereby under said matched condition the net signal impressed upon said circuit is zero but under unmatched condition said circuit is energized as a function of a standing wave, and a detector responsive to the energization of said circuit.

4. In an electric energy transmitting system, the combination of a transmission line, a transmitter, a resistive load as a terminus of said line, said load being matched with the impedance of said line, a resonant circuit, a detector, and two conducting lines respectively including coils coupled to said resonant circuit, said lines being connected to said transmission lines at predetermined spaced points thereon to cause two signals to reach said detector 180° out of phase, and being initially adjusted to equalize the strength of said two signals, said lines also forming two equal signal paths from said load, whereby a signal developed from a mismatched load causes said resonant circuit to operate said detector.

5. In an electric energy transmitting system, the combination of a transmission line, a transmitter, a resistive load as a terminus of said line, said load being matched with the impedance of said line, a resonant circuit, a detector, two conducting lines connected to said transmission line one quarter of a wave length apart and coupled to said circuit to produce two signals from said transmitter 180° out of phase, the line nearer said transmitter having a length $l$ and the other line having a length $$l+\frac{\lambda}{4}$$

to form equal signal paths from said load, whereby a mismatched load causes said resonant circuit to operate said detector.

DANIEL BLITZ.

REFERENCES CITED

The following references are of record in the file of this patent:

UNITED STATES PATENTS

| Number | Name | Date |
| --- | --- | --- |
| 1,589,699 | Hunt | June 22, 1926 |
| 2,111,595 | Leng | Mar. 22, 1938 |
| 2,366,660 | Usselman | Jan. 2, 1945 |
| 2,423,390 | Korman | July 1, 1947 |